(12) United States Patent
Kitamori et al.

(10) Patent No.: US 7,079,315 B2
(45) Date of Patent: Jul. 18, 2006

(54) THERMAL LENS MICROSCOPE DEVICE

(75) Inventors: Takehiko Kitamori, Tokyo (JP);
Akihide Hibara, Tokyo (JP); Manabu Tokeshi, Kanagawa (JP)

(73) Assignee: Kanagawa Academy of Science and Technology, Kanagawa (JP)

( * ) Notice: Subject to any disclaimer, the term of this patent is extended or adjusted under 35 U.S.C. 154(b) by 0 days.

(21) Appl. No.: 11/118,320

(22) Filed: May 2, 2005

(65) Prior Publication Data

US 2005/0190439 A1 Sep. 1, 2005

Related U.S. Application Data

(63) Continuation of application No. 10/363,681, filed as application No. PCT/JP01/07794 on Sep. 7, 2001, now abandoned.

(30) Foreign Application Priority Data

Sep. 8, 2000 (JP) .............................. 2000-273678

(51) Int. Cl.
*G02B 21/00* (2006.01)
(52) U.S. Cl. .................... 359/368; 356/432; 356/442
(58) Field of Classification Search .................... None
See application file for complete search history.

(56) References Cited

U.S. PATENT DOCUMENTS

| | | | | |
|---|---|---|---|---|
| 4,589,783 A | * | 5/1986 | Thomas et al. | 374/45 |
| 4,591,272 A | * | 5/1986 | Morris et al. | 356/432 |
| 4,750,822 A | * | 6/1988 | Rosencwaig et al. | 356/445 |
| 5,365,065 A | * | 11/1994 | Power | 250/330 |
| 5,513,006 A | * | 4/1996 | Schulz et al. | 356/432 |
| 5,760,400 A | * | 6/1998 | Prekel et al. | 250/341.6 |
| 6,263,233 B1 | * | 7/2001 | Zavislan et al. | 600/476 |
| 6,452,710 B1 | * | 9/2002 | Hiraga et al. | 359/244 |
| 6,650,357 B1 | | 11/2003 | Richardson | 348/80 |

FOREIGN PATENT DOCUMENTS

| | | |
|---|---|---|
| JP | 2000-002677 | 1/2000 |
| JP | 2001-059829 | 3/2001 |
| WO | 99/08149 | 2/1999 |

* cited by examiner

*Primary Examiner*—Drew A. Dunn
*Assistant Examiner*—Lee Fineman
(74) *Attorney, Agent, or Firm*—Wenderoth, Lind & Ponack, L.L.P.

(57) ABSTRACT

A small and portable microscope for ultramicroanalysis has an excellent spatial resolution and fixed position analyzing ability. The microscope has at least a part of an excitation light source, a part of a probe light source and a part of a thermal lens microscope optical system arranged integrally in a device body. The device body also includes an analyzing cell and substrates supporting the analyzing cell.

2 Claims, 2 Drawing Sheets

THERMAL LENS MICROSCOPE DEVICE

This application is a continuation application of Ser. No. 10/363,681, filed Jul. 1, 2003 now abandoned, which is a U.S. National Stage application of International Application Serial No. PCT/JP01/07794, filed Sep. 7, 2001, and which are incorporated herein by reference.

TECHNICAL FIELD

The invention of this application relates to a thermal lens microscope device. More specifically, the invention of this application relates to a desktop type palmtop size thermal lens microscope device capable of executing highly accurate ultramicroanalysis in a micro space and allowing convenient measurement at any place.

BACKGROUND ART

Conventionally, an integration technique for executing a chemical reaction in a micro space has been attracting attention from the viewpoint of the high speed property of the chemical reaction, the reaction with a micro amount, the on sight analysis, or the like, so that its study is being promoted vigorously worldwide.

The integration technique for the chemical reaction is also discussed by the present inventors, whereby a photothermal conversion absorption analysis method utilizing a thermal lens effect generated by the light absorption in a sample in a liquid in a micro channel in a device using a glass substrate, or the like has been established so as to pave the way for practical use.

However, according to the analysis method by the thermal lens microscope as mentioned above provided by the present inventors, the configuration of an analysis appliance enabling the same includes, for example, a light source, a measuring part, an optical system of a detecting part (photo electric conversion part), or the like provided complicatedly as a system so as to be bulky, and thus portability is lacking. Therefore, at the time of executing the analysis or the chemical reaction using the thermal lens microscope system, its size has been a factor that limits places or operations thereof.

In view of the circumstances, since the analysis by the thermal lens microscope system has many advantages, such as a wide range of analyzable subjects, miniaturization with a high versatility has been strongly desired.

Then, the present inventors have developed a desktop thermal lens microscope device comprising small size laser light sources as an excitation light source and a probe light source, with the excitation light source, the probe light source and a thermal lens microscope optical system mounted and integrated in a single body so as to provide a compact structure. According to the desktop thermal lens microscope device, all the elements are mounted and integrated in a single body, like a desktop type microscope, so as to successfully miniaturize the conventional huge microscope to a desktop type.

However, for the desktop thermal lens microscope device, further improvement has been desired.

That is, miniaturization to increase portability is desired. According to the miniaturization, the mobility of the ultrasensitive analysis of an ultramicro chemical substance in medical diagnosis or an environmental measurement can dramatically be improved so as to enable the ultramicroanalysis microscope having excellent spatial resolution and quantitative analysis ability.

The invention of this application has been achieved in view of the above-mentioned circumstances, and an object thereof is to provide a novel palmtop size thermal lens microscope device having portability, and enabling the ultrasensitive analysis of an ultramicro chemical substance in medical diagnosis or an environmental measurement.

SUMMARY OF THE INVENTION

For solving the above-mentioned problems, the invention of this application provides, firstly, a thermal lens microscope device, characterized in that at least a part of an excitation light source, a part of a probe light source and a part of a thermal lens microscope optical system are provided integrally in a device main body comprising an analyzing cell and a substrate for supporting the same.

Moreover, the invention of this application provides, secondly, a thermal lens microscope device, characterized in that at least a part of a detecting system and a part of a detecting optical system are provided integrally in a device main body comprising an analyzing cell and a substrate for supporting the same. The invention of this application provides, thirdly, the thermal lens microscope device according to the second invention, characterized in that a part or the entirety of a signal processing system and an electric circuit for transmitting and receiving the detection results are provided integrally in the device main body. The invention of this application provides, fourthly, the thermal lens microscope device according to the second or third invention, characterized in that at least a part of the excitation light source, a part of the probe light source and a part of the thermal lens microscope optical system are provided integrally in the device main body.

Figure 1:
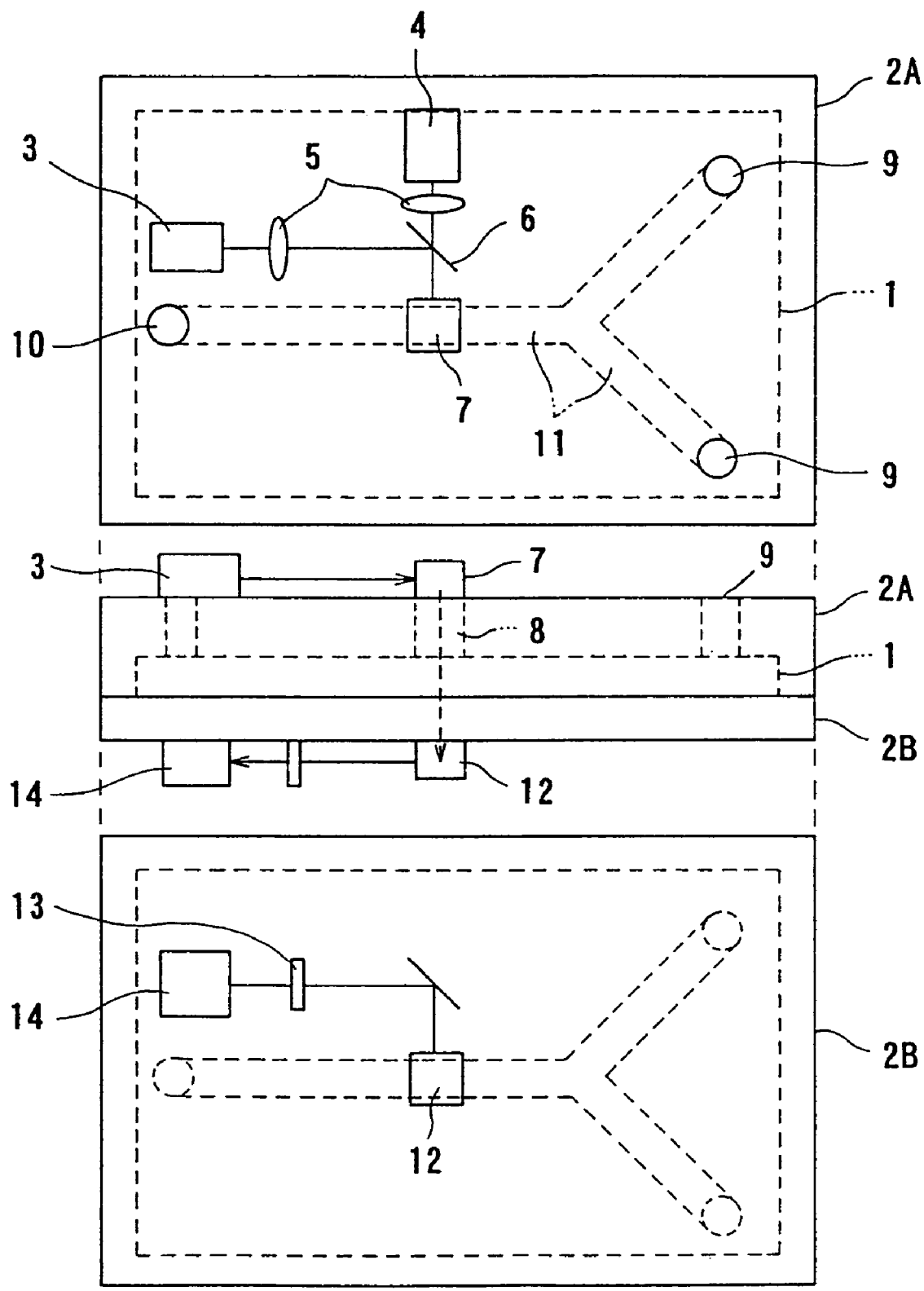
FIG. 1 is a plane view, a front view and a bottom view showing an example of this invention.

In the figures, the numerals represent the following.
1 analyzing cell
2A upper substrate
2B lower substrate
3 excitation light source
4 probe light source
5 lens system
6 dichroic mirror
7 prism
8 objective lens
9 inlet
10 outlet
11 micro channel
12 prism
13 filter
14 optical detector

DETAILED DESCRIPTION OF THE INVENTION

The invention of this application has the above-mentioned characteristics. Hereinafter, embodiments thereof will be explained.

As mentioned above, the thermal lens microscope device of the invention of this application is characterized in that in a device main body comprising an analyzing cell and a substrate for supporting the same:

<A> at least a part of an excitation light source, a part of a probe light source and a part of a thermal lens microscope optical system;

<B> at least a part of a detecting system and a part of a detecting optical system are provided integrally;

both of <A> and <B> or one of them are provided integrally, and furthermore, <C> a part or the entirety of a signal processing system and an electric circuit for transmitting and receiving the detection results are provided integrally with <B>.

Needless to say, the thermal lens microscope is a system for detecting the substances in a sample by inputting an excitation light and a probe light for inputting the probe light to a thermal lens formed according to the irradiation of the excitation light into the sample, and measuring the probe light diffusion by the thermal lens.

According to the thermal lens microscope device of this invention as mentioned above, as conventionally proposed by the present inventors, a light transmissible cell substrate, such as a glass, a silicon and a plastic with micro, fine channels (liquid passage paths), ports (liquid storage parts), or the like formed by etching, is used as an analyzing cell. Then, a substrate for supporting the analyzing cell can be made of a similar light transmissible material such that the analyzing cell is supported on one side thereof, or it is supported by clamping from both the upper and lower sides. The supporting forms may be varied.

Then, the above-mentioned <A>, <B> and <C> may be integrated partially or entirely with the analyzing cell or the substrate for supporting the same. Here, "integrated" means that they are not disposed outside the analyzing cell or the substrate with a space disposed therebetween, but they are abutted on or embedded in the inside or the surface of the analyzing cell or the substrate.

FIG. 1 is a plane view, a front view and a bottom view showing an example of a thermal lens microscope device of this invention. For example, as shown as an example in FIG. 1, the device main body has an analyzing cell (1) clamped by an upper substrate (2A) and a lower substrate (2B), and a lens system (5) including a beam expander, a collimator lens, or the like, an optical system of the thermal lens microscope including a dichroic mirror (6), a prism (7), or the like are provided integrally with the upper substrate (2A) together with an excitation light source (3) and a probe light source (4). An objective lens (8) may further be integrated immediately below the prism (7) by embedding.

Moreover, in the upper substrate (2A), a sample or reaction chemical inlet (9) and a liquid outlet (10) are formed so as to each communicate with a micro channel (11) provided in the analyzing cell (1).

In contrast, in the lower substrate (2B), a detecting optical system including a prism (12), a mirror, a filter (13), or the like, and an optical detector (14) are provided integrally.

Figure 2:
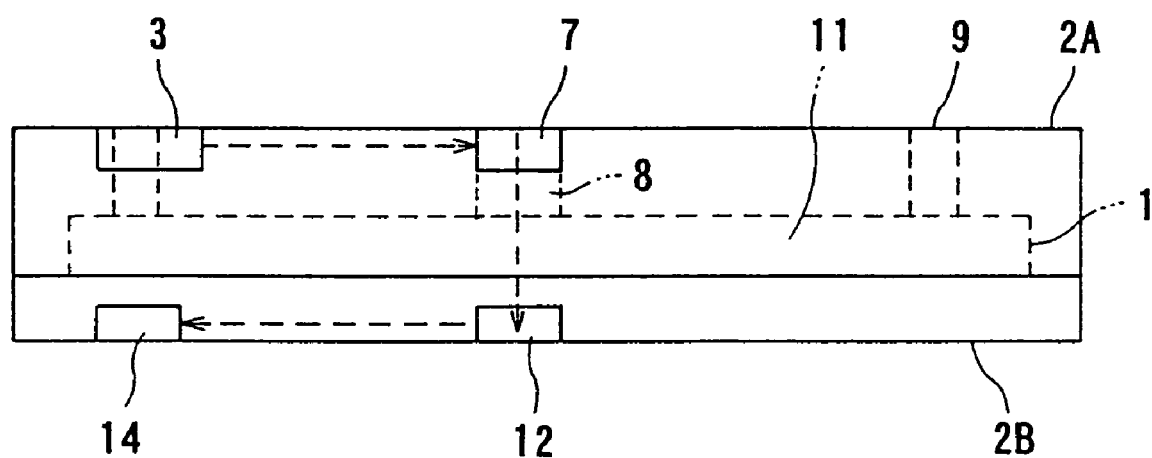
FIG. 2 is a front view showing another example of this invention.

FIG. 2 shows an example in which the above-mentioned elements of the thermal lens microscope system including the excitation light source (3) are provided integrally by embedding the same in the upper substrate (2A) and the lower substrate (2B) instead of providing the same integrally on the surface of the upper substrate (2A) and the lower substrate (2B) as in the above-mentioned example of FIG. 1. According to such various kinds of the configurations, the thermal lens microscope devices of this invention can be provided.

Of course, this invention includes those having a part of the elements, such as a light source and a detector, disposed outside the upper and lower substrates (2A), (2B). The system configuration can be changed according to the use condition, the use environment, or the like.

In any case, for the excitation light source (3), various kinds of small size laser light sources such as a small size semiconductor laser and a semiconductor laser excitation solid laser can be used. The excitation light outputted from the excitation light source (3) is for example modulated by a chopper, and furthermore, it is radiated from a beam expander as a plane wave.

In contrast, the probe light outputted from the probe light source (4) as a small size laser light source like the excitation light source (3) is radiated as a parallel light beam flux, for example, by a collimator lens so as to be synthesized by the dichroic mirror (6) concentrically with the excitation light.

The synthesized light made from the excitation light and the probe light passes through the prism (7) and the objective lens (8) so as to be directed to a liquid sample in the analyzing cell (1). Inside the sample, a thermal lens is formed based on the photothermal conversion phenomenon by a part of the excitation light comprising the synthesized light, and the probe light passed through the thermal lens is diffused so as to transmit through the sample together with the excitation light, which has not been concerned with the photothermal conversion. In principle, the excitation light is influenced by the thermal lens, however, only to a slight degree compared with the probe light.

The sample is tested in the above-mentioned injecting manner. For example, it is injected independently from, for example, a complexing agent, an immune response reagent, or the like. According to the reaction in the micro channel (11), the micro component in the sample can be detected by the above-mentioned thermal lens microscope.

For example, as to the quantitative analysis of nitrogen oxide, nitrogen oxide in cigarette smoke is oxidized and absorbed in an alkaline (pH 13) aqueous solution of a hydrogen peroxide as a nitrous acid ion and reacting the same with an N-1-naphthyl ethylene diamine as a color developing reagent so as to develop a reddish purple color (peak absorbance wavelength 544 nm). This can be detected by the thermal lens microscope by the light irradiation to the micro channel (11). As the excitation light, a semiconductor YAG laser (second harmonic) having a 532 nm wavelength and a 100 mW output can be used. Moreover, as the probe light, a semiconductor laser having a 680 nm wavelength and a 5 mW output can be used.

INDUSTRIAL APPLICABILITY

As heretofore explained in detail, according to the invention of this application, a small size portable microscope for the ultramicroanalysis having the excellent spatial resolution and quantitative analysis ability can be provided.

The invention claimed is:

1. A microscope device comprising:
a main body including:
  a light transmissible upper substrate;
  a light transmissible lower substrate; and
  a light transmissible analyzing cell having a micro channel for passing or storing a sample liquid,
    wherein the light transmissible analyzing cell is formed between the light transmissible upper substrate and the light transmissible lower substrate;
an excitation light source operable to emit an excitation light;
a probe light source operable to emit a probe light;
a thermal lens microscope optical system including:

a light synthesizing member operable to synthesize the excitation light concentrically with the probe light;

a first prism disposed above the micro channel, the first prism being operable to change a direction of an optical path of the synthesized light from the light synthesizing member to a vertically downward direction with respect to the main body; and an objective lens disposed below the first prism and above the micro channel, wherein the excitation light source, the probe light source, the light synthesizing member, the first prism, and the objective lens are integrated with the light transmissible analyzing cell or the light transmissible upper substrate; and a detecting optical system including:
   an optical detector; and
   a second prism disposed below the objective lens and the micro channel, the second prism being operable to change a direction of an optical path of light passed through a thermal lens formed within the liquid sample to a direction toward the optical detector, wherein the optical detector is operable to detect the light from the second prism, and wherein the optical detector and the second prism are integrated with the light transmissible lower substrate.

2. The microscope device according to claim 1, wherein the light transmissible upper substrate has at least one inlet opening communicating with the micro channel and at least one outlet opening communicating with the micro channel formed therein.

* * * * *